(12) United States Patent
Gradischnig

(10) Patent No.: US 7,075,947 B1
(45) Date of Patent: Jul. 11, 2006

(54) SIGNALING SYSTEM OF A SIGNALING POINT

(75) Inventor: Klaus David Gradischnig, Gauting (DE)

(73) Assignee: Siemens A.G., Munich (DE)

( * ) Notice: Subject to any disclaimer, the term of this patent is extended or adjusted under 35 U.S.C. 154(b) by 0 days.

(21) Appl. No.: 09/763,706

(22) PCT Filed: Aug. 25, 1999

(86) PCT No.: PCT/EP99/06239

§ 371 (c)(1),
(2), (4) Date: Feb. 23, 2001

(87) PCT Pub. No.: WO00/11883

PCT Pub. Date: Mar. 2, 2000

(30) Foreign Application Priority Data

Aug. 25, 1998 (DE) .................. 981 16 018

(51) Int. Cl.
*H04J 1/14* (2006.01)

(52) U.S. Cl. .............. 370/496; 370/426; 370/522

(58) Field of Classification Search ............... 370/522, 370/469, 225, 227, 230, 352, 353, 356, 385, 370/396, 401, 467, 351, 392, 397, 399, 426, 370/496, 524; 379/115.01, 114.28, 210.01, 379/221.01, 221.1, 221.13, 230; 709/242, 709/249

See application file for complete search history.

(56) References Cited

U.S. PATENT DOCUMENTS

| 5,481,673 A | 1/1996 | Michelson | |
| 5,550,914 A * | 8/1996 | Clarke et al. | 379/230 |
| 5,680,446 A * | 10/1997 | Fleischer et al. | 379/114.28 |
| 5,708,702 A * | 1/1998 | De Paul et al. | 379/221.1 |
| 5,923,659 A * | 7/1999 | Curry et al. | 370/401 |
| 5,953,404 A * | 9/1999 | Fikis et al. | 379/230 |
| 5,966,431 A * | 10/1999 | Reiman et al. | 379/115.01 |
| 5,983,217 A * | 11/1999 | Khosravi-Sichani et al. | 707/3 |
| 6,167,129 A * | 12/2000 | Fikis et al. | 379/230 |
| 6,324,183 B1* | 11/2001 | Miller et al. | 370/467 |
| 6,332,022 B1* | 12/2001 | Martinez | 379/220.01 |
| 6,393,022 B1* | 5/2002 | Hewett et al. | 370/385 |
| 6,427,010 B1* | 7/2002 | Farris et al. | 379/221.13 |
| 6,747,980 B1* | 6/2004 | Dykhuizen et al. | 370/401 |

FOREIGN PATENT DOCUMENTS

WO 97/11563 3/1997

OTHER PUBLICATIONS

"Uberwachungs-und Managementsystem fur Netze mit dem Zeichengabesystem Nr. 7"; Kuhnert, et al.; 688 NTZ Nachrichten Technische Zeitschrift 49; Feb. 1996; pp. 10-15.

(Continued)

*Primary Examiner*—Phirin Sam
(74) *Attorney, Agent, or Firm*—Neifeld IP Law, PC

(57) ABSTRACT

An apparatus, system and method for converting point codes in a signal transfer point, STP, in a telecommunications signaling system. The STP includes a point code conversion function (500) which converts point codes designating the origination and destination signaling points for a signaling message. The conversion function can be incorporated between the signaling link layer (200) and the network layer (300) of the message transfer part, MTP, functionality of the STP.

15 Claims, 3 Drawing Sheets

OTHER PUBLICATIONS

"Common Channel Signaling Interface for Local Exchange Carrier to Interexchange Carrier Interconnection"; Goldberg, et al.; IEEE Communications Magazine; Jul. 1990; pp. 64-71.

"Interconnecting Signaling Networks"; Murphy, et al.; Proceedings of the National Communications Forum; Oct. 1989; pp. 495-498.

* cited by examiner

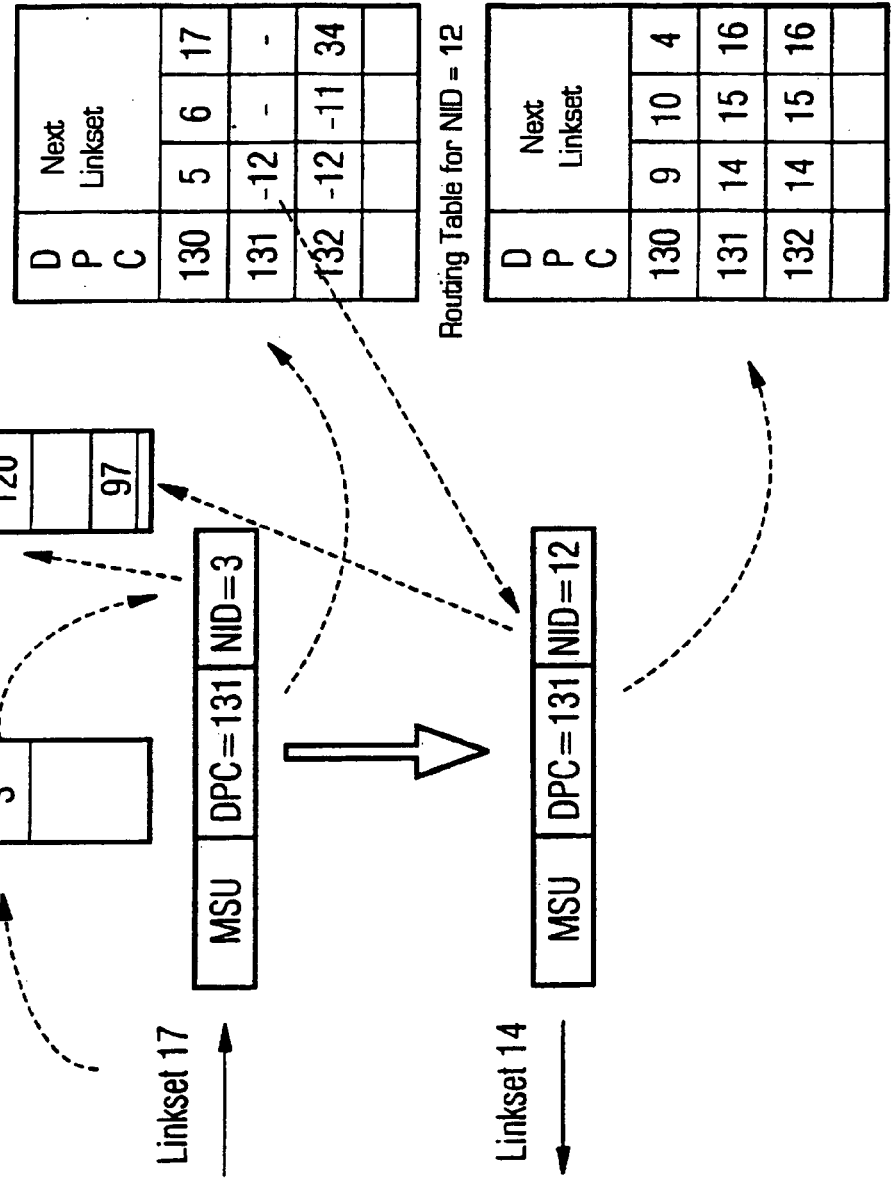

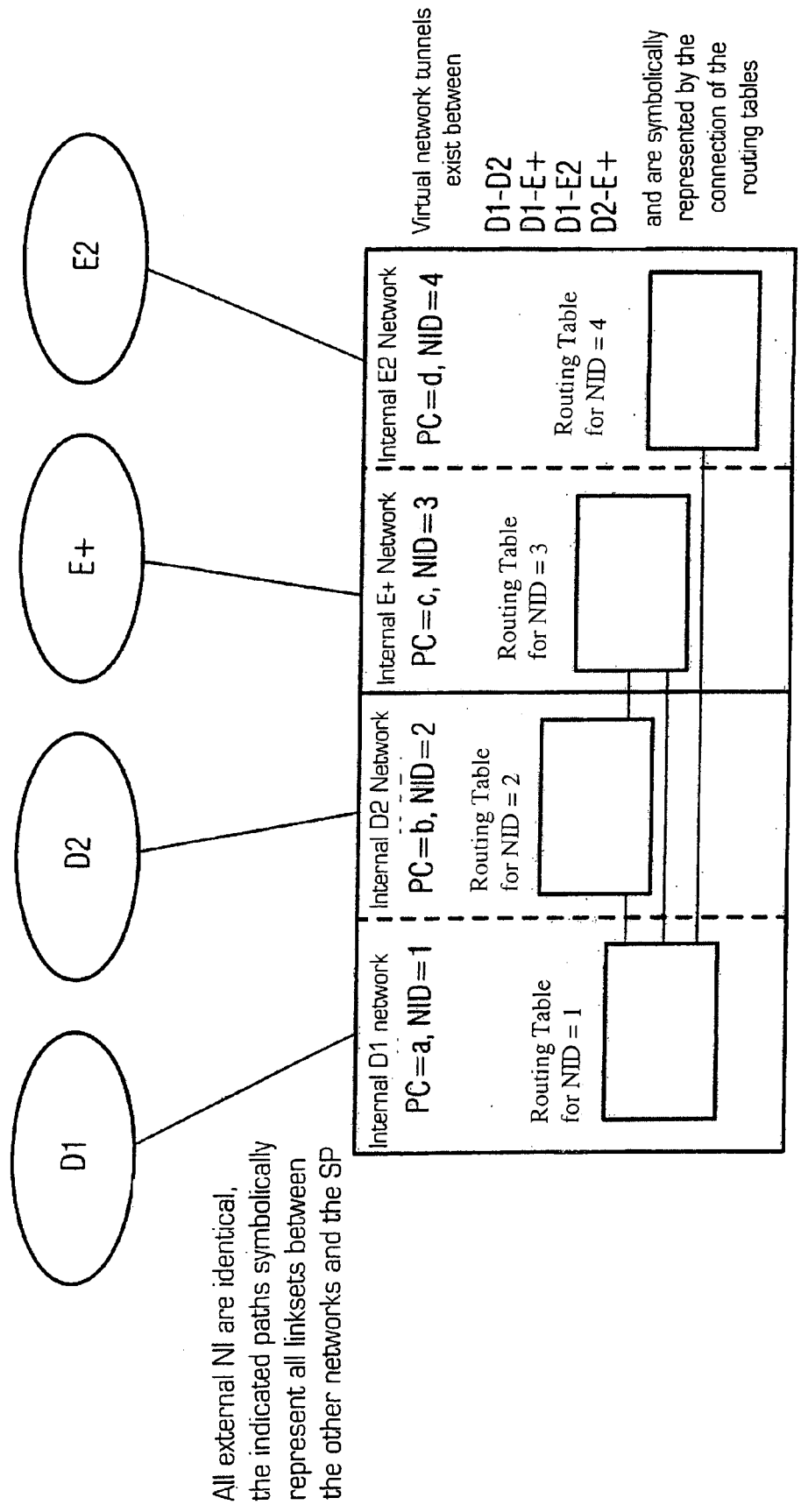
FIG 2 - Incoming Linkset/DPC Screening

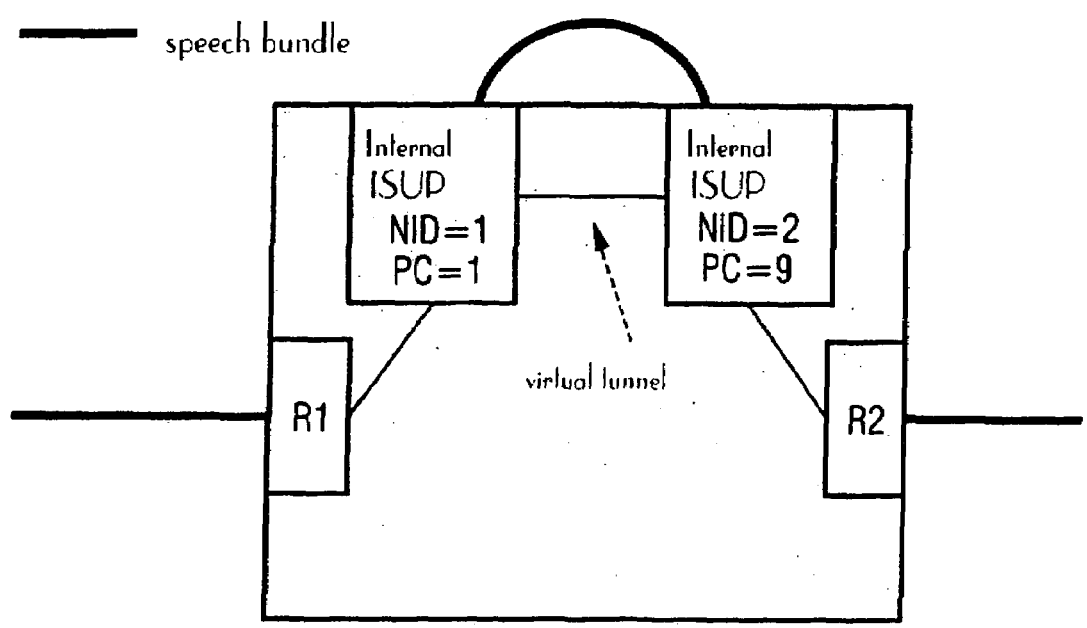
FIG 3 - Interworking of R1 and R2 via ISUP

SIGNALING SYSTEM OF A SIGNALING POINT

BACKGROUND

1. Field of the Invention

The present invention generally pertains to signaling systems, and particularly to channel-oriented signaling systems.

2. Discussion of the Related Art

Ordinarily, in channel-oriented signaling systems, such as the Signaling System R5, it is possible for a signaling point to communicate with, itself or to set up a connection with itself, via a useful channel loop.

However, in Signaling System 7, also called SS7 or ZGS7, this is not possible, although such loops would be advantageous for the solution of a plurality of problems including the interworking of different signaling systems.

For the interworking of different signaling systems, it would be extremely expedient if all signaling systems interwork with a designated signaling system, rather than each signaling system interworking with every other.

In addition, technical problems associated with using similar methods, such as incoming linkset/DPC screening as set forth in protocol Q.705,§8, would also be solved.

In ZGS7, a signaling point is identified by an address, called the signaling point code (SPC). If the signaling point code is used as the destination address, it is also called the destination point code (DPC). If a signaling point designates an originating address, it is called the origination point code (OPC).

In general, level 3 of the message transfer part (MTP) cannot send a message to its own signaling point code or cannot receive a message from itself. Certain users of the MTP, for example TUP and ISUP, also normally cannot send channel-related messages to themselves, even if the MTP were to enable this.

In order to enable such loops, special methods have been implemented that consist essentially of loops specifying signaling channels on which the destination and/or sender address are inverted or complemented. If necessary, similar user-specific modifications must be carried out for users.

A solution to this problem would be to use what are known as physical network tunnels, wherein a link, known as a loop link, is fed back in a loop from a signaling point to the same signaling point, and two different network identities are allocated thereto, one at the input side and the other at the output side.

However, physical tunnels have the disadvantage that their use requires additional hardware, such as the loop links, etc., and messages that must travel through the tunnel experience an additional delay.

SUMMARY OF THE INVENTION

Accordingly, it is an object of the present invention to provide a system that makes network tunneling possible.

It is a further object of the invention to provide a system that makes virtual tunneling possible.

It is another object of the invention to provide a system wherein the virtual tunnel considerable reduces additional hardware outlay and time delay without requiring a large development expense.

These and other objects of the invention will become apparent from careful review of the following detailed description of the preferred embodiment, which is to be read in conjunction with study of the accompanying drawing figures.

BRIEF DESCRIPTION OF THE DRAWINGS

FIG. 1 shows a method according to the present invention;

FIG. 2 shows forms of incoming linkset/DPC screening according to the present invention.

FIG. 3 shows an interworking of various signaling systems according to the present invention.

DETAILED DESCRIPTION OF THE PREFERRED EMBODIMENT

The present invention will not be described in detail on the basis of the system ZGS7, also known as Signaling System 7(SS7). The description assumes a multiple network system that supports 32 MPT networks.

In the ZGS7, a network is identified by an external network indicator NI, which is contained in externally observable messages.

In the messages, two bits are reserved for the NI. Therefore, up to four networks can be distinguished in a node. Although a normal signaling link belongs to only one network, it is possible to sufficiently distinguish the network by allocating individual links to particular networks. Therefore, the NI is no longer required as a distinguished feature.

In fact, there are systems—already existing or in the planning stages—that support more than four (e.g., 8 or 32) signaling networks. A network identity NID internally allocated to each signaling link or link set, and an NI is externally allocated to each internal network identifier NID. Networks having different internal identity can thereby use the same external NI throughout. Each internal network is thereby completely separated internally from the other networks. This method of the decoupling of the external NI and the internal NID is also applicable to systems that support only four or fewer MTP networks. This design is called the multiple network design.

Existing or planned systems that support the multiple network design normally route MSUs in that, from a routing table, the next link or linkset to the desired destination that is currently to be used is determined. For each internal logical network, there is thereby exactly one table, and the tables of these networks are independent of one another. For these systems, a simple modification of these routing tables is now carried out such that in the routing tables the next path selected can be not only a particular link or linkset but also a different network.

Given a incoming MSU, the system determines the internal network identity (NID) of the network to which this line or linkset belongs on the basis of the link at which the MSU arrived.

FIG. 1 shows this process for an MSU having DPC=131, which is received at a link or linkset belonging to the link or linkset 17.

If the system determines that the MSU must be rerouted, the system selects, on the basis of the DPC of the MSU, a line or row from a routing table belonging to the NID. This line contains the identities, such as numbers, of the possible additional routes, such as links or linksets, and specially designated identities, for example, the number −1 to −32, which not represent not links or linksets, but rather, the negative internal NID.

If during routing, such a "route" is recognized, the NID of the MSU is correspondingly modified, and is supplied again to the routing. But this time in the other network, the system again determines on the basis of the DPC of the MSU, whether the SP represents the endpoint for the MSU. If not, the system takes information for the routing of the MSU from a routing table belonging to the NID. As discussed with reference to FIG. 1, the entry –12 is the routing table of the NID=3 determines the "tunnel" to the network having NID=12 as the next path for the DPC 131. Also with reference to FIG. 1, the SPC belonging to NID=12 is 97, and the next path of the MSU travels via linkset 14. Thus, network management messages are also routed correspondingly.

With the exception of the production of test traffic and actual physical loops using virtual tunnels, all problems can be solved using the physical tunnels according to the present invention.

FIG. 2 shows an example of how certain forms of a incoming linkset/DCP screening can be solved using the present invention.

The operator of a signaling transfer point (STP) offers SS7, also know as ZGS7, interconnect services to other communication network operators. In the example in FIG. 2, these are networkd D1, D2, E+, and E2. Other networks may make unlimited use of the STP for SS7 traffic inside their own networks. For traffic between the networks, however, there are the following limitations: E+ and D2 may communication only with one another and with D1. E2 may communicate only with D1. In order to enforce these agreements, the operator of the STP must be able to prevent unauthorized traffic between the networks. He can accomplish this by terminating the linksets to the different operators internally in different SS7 networks.

As is shown symbolically in FIG. 2, the internal networks are then connected by virtual tunnels, in such a way that virtual tunnels are set up only between those networks for which traffic is permitted. For example, for destinations (DPCs) that belong to the operator E2, no routes are set up in the routing tables for the internal networks 2 and 3, corresponding to D2 and E+. In contrast, for destinations (DPC) in D1, special routes representing the virtual tunnels are for example set up in the routing tables of the internal networks 2, 3 and 4.

The limitation of the permitted traffic need not absolutely be limited only to entire networks. Rather, the routing tables can be constructed such that traffic from E+ is possible only to particular designated destinations in D2 by making no entries in the routing table in the network 3 for destinations in D2 that are not allowed.

In FIG. 3, an example an interworking of various signaling systems (R1, R2, ISUP) is shown. An interworking is realized between R1 and ISUP and between R2 and ISUP, but not between R1 and R2. An ISUP is located both in the internal network having NID=2. Externally, both networks use for example the same NI, but use different point codes.

A call between R1 and R2 is routed via the ISUP loop. For this purpose, it is sufficient to correspondingly set up the ZGS7 routing tables in both networks, as well as the routing tables for the call processing, and to construct the required speech bundles for the ISUP loop. The ISUPs of the two internal network communication via the virtual tunner (shown symbolically) between NID=1 and NID=2. A physically looped signaling link or linkset is therefore not required.

In FIG. 3, NID=3 is determined as the internal NID. As the next step, on the basis of the DPC of the MSU, a determination is made whether the SP represents the endpoint for the MSU, such as whether the SPC, which SPC depends on the NID of the SP, agrees with the DPC of the MSU, or whether the MSU must be rerouted. For instance, in FIG. 1, it is the SPC=120 that belongs to NID=3.

A great advantage of the invention is that existing mechanisms (routing tables and multiple networks) can be used, at low expense, in order to provide purely virtual network tunnels, which previously were realized only physically.

The invention can also be used without the multiple network design being supported. However, the problems that can be solved using the tunnel design of the present invention are limited. For example, if the flexible allocation of the external NIs to the internal NIDs is not fully supported, but takes place in 1:1 fashing, then the specified method cannot be used for the incoming linkset/DPC screening. As the number of internal NIDS that are supported, with other flexible mapping of NI to NID becomes fewer, the incoming linkset/DPC screening becomes limited in its flexibility.

What is claimed is:

1. A method for operating a signaling system of a signaling point, the method comprising the steps of:
   determining for a received signaling message on the basis of an internal network identifier, the identity of an internal network to which the signaling message belongs;
   taking from a routing table belonging to the internal network identifier, items of information for routing of the signaling message, wherein the signaling system accesses the routing table using the signaling point code of the signaling message;
   determining on the basis of the type of routing information taken from the routing table, whether an item of routing information is present indicating a link or linkset for forwarding the signaling message, or indicating an internal network identifier; and
   supplying the signaling message with a new routing, if the item of routing information taken from the routing table is an internal network identifier.

2. The method according to claim 1, further comprising the step of:
   defining the internal network identifier of a signaling message by the link or linkset via which the signaling message was received.

3. The method according to claim 2, further comprising the step of:
   indicating the internal network identifier of a signaling message in the signaling message itself.

4. The method according to 3, further comprising the step of:
   using the new routing to cause the system to switch signaling messages between two different internal networks.

5. The method according claim 4, further comprising the step of:
   using the new routing to cause the system to realize an internetworking with other networks.

6. A method for routing a signaling message of a signaling point, comprising the steps of:
   determining, for a signaling message, the identity of an internal network to which the signaling message belongs on the basis of an internal network identifier;

taking from a routing table belonging to the internal network identifier, items of information for routing the signaling message, wherein the routing table is accessed using the signaling point code of the signaling message;

determining on the basis of the type of routing information taken from the routing table, whether an item of routing information is present that indicates a link or linkset useful for forwarding of the signaling message, or indicates the internal network identifier; and applying a new routing to the signaling message if the item of routing information taken from the routing table is an internal network identifier.

7. The method for routing according to claim 6, further comprising the step of:

defining the internal network identifier of a signaling message by the link or linkset via which the signaling message was received.

8. The method for routing according to claim 7, further comprising the step of:

indicating the internal network identifier of a signaling message in the signaling message itself.

9. The method according to claim 8, further comprising the step of:

using the new routing to switch signaling messages between two different internal networks.

10. The method according to claim 9, further comprising the step of:

using the new routing to enable the internal network to internetwork with other internal networks.

11. A method for network tunneling internal to a signaling point, comprising:

determining for a message signaling unit the identity of an internal network to which the message signaling unit belongs on the basis of an internal network identifier;

reading from a routing table associated with the internal network identifier items of information for routing the message signaling unit, wherein the routing table is accessed using the signaling point code of the message signaling unit; and routing the message signaling unit to an internal network of the signaling point if the item of routing information taken from the routing table indicates an internal network identifier.

12. The method according to claim 11, further comprising:

defining the internal network identifier of a message signaling unit by the link or linkset via which the message signaling unit was received.

13. The method for routing according to claim 12, further comprising:

indicating the internal network identifier of a message signaling unit in the message signaling unit itself.

14. The method according to claim 13, further comprising:

using the new routing to switch message signaling units between two different internal networks.

15. The method according to claim 14, further comprising:

using the new routing to enable the internal network to internetwork with other internal networks.

* * * * *